Figure 1:
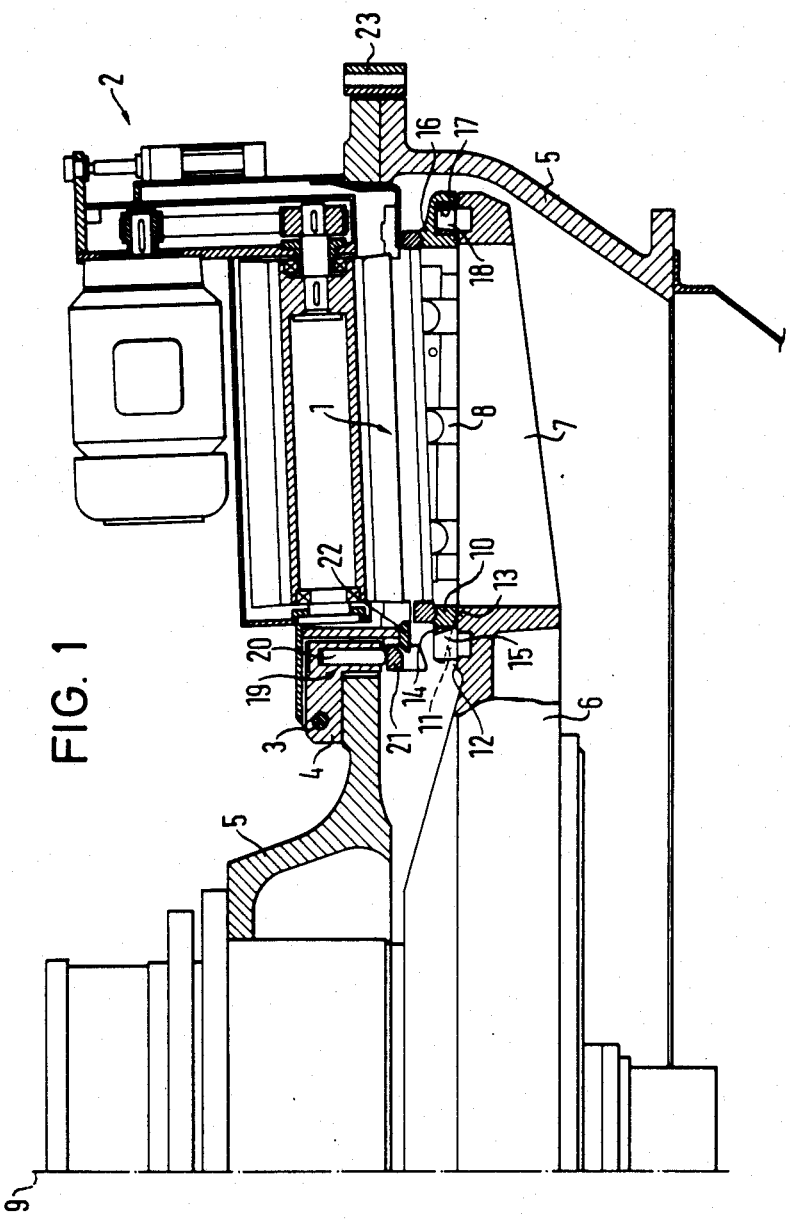

United States Patent [19]

Bittner

[11] Patent Number: 4,674,168

[45] Date of Patent: Jun. 23, 1987

[54] METHOD FOR EXCHANGING THE BLADE RECEIVERS IN DISC CUTTER MACHINES AND DISC CUTTER MACHINES FOR CARRYING OUT THE METHOD

[75] Inventor: Hans-Joachim Bittner, Hagen, Fed. Rep. of Germany

[73] Assignee: H. Putsch GmbH & Comp., Hagen, Fed. Rep. of Germany

[21] Appl. No.: 787,327

[22] Filed: Oct. 15, 1985

[30] Foreign Application Priority Data

Nov. 26, 1984 [DE] Fed. Rep. of Germany ....... 3443056

[51] Int. Cl.⁴ ..................... B23P 19/04; B26D 3/22; C13C 1/06
[52] U.S. Cl. ................ 29/402.08; 29/426.3; 29/252; 241/82; 241/91; 241/93; 83/13; 83/403; 83/481; 83/926 G
[58] Field of Search ............... 83/13, 403, 481, 404.1, 83/167, 701, 926 G; 29/402.08, 426.3, 426.5, 252, 242, 244, 413, 527.6; 241/91, 93, 82

[56] References Cited

U.S. PATENT DOCUMENTS

| | | | |
|---|---|---|---|
| 1,075,624 | 10/1913 | Binkley | 83/404.1 |
| 1,230,329 | 6/1917 | Sailer | 241/91 |
| 1,241,702 | 10/1917 | Binkley et al. | 241/93 |
| 1,474,797 | 11/1923 | Spicer | 83/403 |
| 1,642,705 | 9/1927 | Tuttle | 241/82 |
| 2,470,262 | 5/1949 | Payzer | 29/426.5 |
| 2,884,974 | 5/1959 | Woodward, Jr. | 83/403 |
| 3,139,127 | 6/1964 | Urschel et al. | 83/167 |
| 3,614,823 | 10/1971 | Weber et al. | 29/402.08 X |
| 3,945,105 | 3/1976 | Beaty et al. | 29/402.08 |
| 4,391,172 | 7/1983 | Galland et al. | 83/403 |
| 4,486,936 | 12/1984 | Curry | 29/252 |

FOREIGN PATENT DOCUMENTS 116925 7/1899 Fed. Rep. of Germany.
328166 2/1970 U.S.S.R. .

Primary Examiner—Donald R. Schran
Attorney, Agent, or Firm—Bernard, Rothwell & Brown

[57] ABSTRACT

In order to provide a method and a disc cutter machine for carrying out the method with which the previously strenuous blade receiver exchange is simplified and facilitated, it is provided that the blade receiver (8) to be exchanged is tilted up by means of a tilting arrangement (19) with its end facing the outer side of the disc cutter, received by a guide (27) and drawn out substantially in the radial direction along the guide from the region of the disc cutter (6) and then the new blade receiver is inserted along the guide into the disc cutter.

15 Claims, 5 Drawing Figures

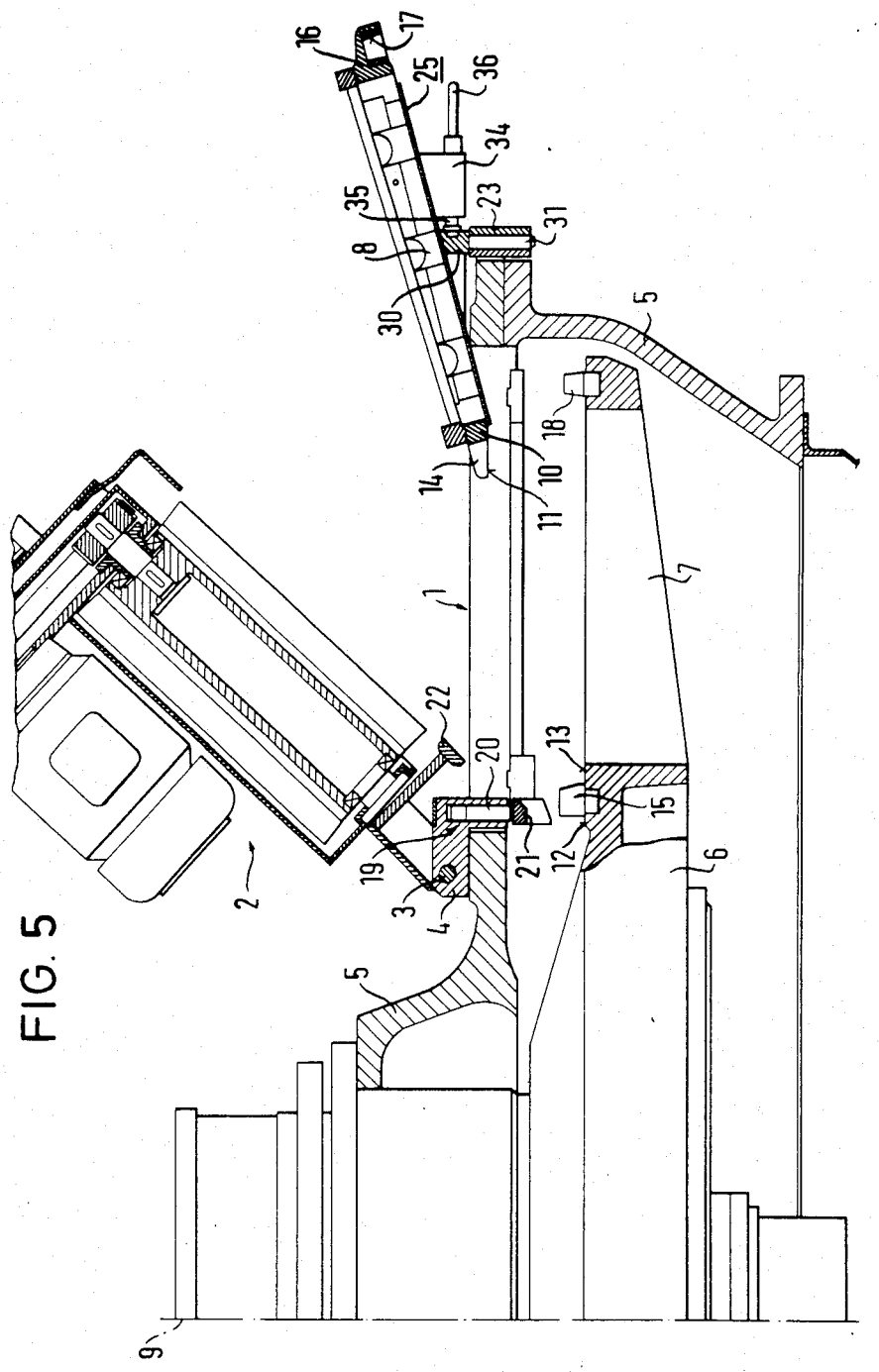

METHOD FOR EXCHANGING THE BLADE RECEIVERS IN DISC CUTTER MACHINES AND DISC CUTTER MACHINES FOR CARRYING OUT THE METHOD

The present invention relates to a method for exchanging the blade receivers in disc cutter machines, in particular for cutting sugar beet, the respective blade receiver to be exchanged being tilted up on one side in an exchange position of the disc cutter, the disc cutter being removed, and thereafter a new blade receiver being inserted into the disc cutter. The invention also relates to a disc cutter machine for carrying out the method.

The exchange of the blade receivers in disc cutter machines, in particular those for sugar beet, has hitherto been carried out manually. The previously practiced mode of operation requires much strength and must in addition be carried out in an anatomically unfavourable body position, that is to say in a bent position. Thus, each blade receiver must be gripped by the service person with a special clamp, freed with a jerk and then lifted out of the disc cutter through the blade receiver exchange opening of the machine housing. For each disc cutter machine, each exchange cycle requires as the case may be twenty-four or thirty-two such releasing and lifting processes. After each of these releasing and lifting processes, in addition a new blade receiver must be inserted which likewise requires strength. Since each blade receiver weighs about 10 kg, a total weight of 500 to 650 kg must be managed for each exchange cycle alone. Since for smooth running of the cutting operation a down time which is at short as possible must be achieved, a time interval of only 12 to 15 minutes is available for each exchange cycle.

Under normal operating conditions, such an exchange cycle is required approximately every eight hours. In the event of increased dirt and foreign bodies this time interval can also be substantially shortened.

In order to simplify the above-described difficult operation, disc cutter machines are already known in which the particularly strenuous "release" of the balde receivers from the disc cutter is achieved by means of a piston cylinder arrangement arranged beneath the disc cutter. By means of a pushing member secured on the free end of the piston rod of the piston cylinder arrangement, the end of the respective blade receiver facing the disc cutter axis is tilted up so that now the service person only needs to grip and lift out the blade receiver by means of the special clamp. In spite of this simplification, the remaining operating steps still require considerable effort. Also, it is still necessary to carry out these operating steps in an anatomically unfavourable position of the body.

An object of the present invention is to provide a method and a disc cutter machine for carrying out the method with which the previously strenuous blade receiver exchange is simplified and made easier.

In connection with the method of operation, this object is achieved according to the invention in that the blade receiver to be exchanged is tilted up mechanically with its end at the outer side of the disc cutter, is gripped by a guide and is drawn out in a substantially radial direction along the guide from the region of the disc cutter and then the new blade receiver is inserted via the guide into the disc cutter.

By means of the method according to the invention, the exchange of the blade receivers is simplified to a degree previously not achieved and in particular it is made easier in respect of the effort necessary therefor. Thus the tilting up of the end on the outer side of the disc cutter until it is gripped by the guide is carried out mechanically. As a result of the positioning of the blade receivers in the guide, it is then no longer necessary to lift the weight of the blade receivers. On the contrary, the blade receivers need only—manually or mechanically—be displaced along the guide. This displacement movement requires no strenuous effort or skill either in the removal of the respective blade receiver to be exchanged or in the insertion of the new blade receiver.

Since the blade receivers are gripped by the guide in a position in which the end on the outer side of the disc is tilted up, the guide path increases automatically with increasing distance from the axis of the disc cutter. This has the consequence that the blade receivers in the region of the end of the guide outside the machine are located at a height which permits operation in an anatomically favourable position of the body.

During the blade receiver exchanging process it was previously necessary to "thread" the new blade receivers in a complicated manner into the disc cutter. This operating process had to be carried out in a bent position of the body and required a certain skill. According to an advantageous further development of the method according to the invention, "threading in" of the blade receivers in a manner requiring dexterity is no longer necessary. This is achieved according to the invention in that the new blade receiver, when it is pushed in via the guide on the disc cutter is first centered in the peripheral direction with its end on the inner side of the disc cutter and after tilting is centered in the peripheral direction and in the radial direction with its end on the outer side of the disc cutter.

A disc cutter machine suitable for carrying out the method according to the invention has a tilting arrangement for tilting up each blade receiver to be exchanged in the region of the outer side of the disc cutter and a guide which is movable substantially radially and supports the respective blade receiver.

Basically, as already mentioned above, the displacement of the blade receivers along the guide can be carried out manually. If however this process is also to be independent of manual labour, it is expedient to provide a pulling and displcing device on the blade receiver resting in the guide. Emptying and loading of such a drawing and displacing device can basically be carried out manually. In order to avoid lifting of the blade receivers in this connection, transport frames or cars arranged at the same height can be provided for the blade receivers to be removed and the new blade receivers. It is however according to an advantageous further development of the invention, also possible to automotize this operating process in that on the pulling and displacing device a respective magazine is connected for automatically receiving the blade receiver to be exchanged and automatically releasing the new blade receiver.

Fundamentally, the tilting arrangement for the blade receivers can be constructed in any desired manner. Thus for example beneath the blade receivers in the region of the outer side of the disc cutter a hydraulic cylinder can be arranged which acts from below with a pushing member on the end of the blade receiver at the outer side of the disc cutter. According to an advantageous further development of the invention, the tilting arrangement is however arranged over the disc cutter in the region of the end of the blade receiver on the inner side of the disc cutter. With such a configuration, none of the elements of the tilting arrangement are located in the region of the lower side of the disc cutter, so that passage of the cuttings is not interrupted.

In a preferred exemplary embodiment of such a tilting arrangement arranged above the disc cutter, the blade receiver is provided in the region of the end facing the inner side of the disc cutter on its lower side with an incline increasing towards the axis of the disc cutter and the disc cutter is equipped with a flat surface in the contact region for this end of the blade receiver. By means of simple pressure on the upper side of the end of the blade receiver, in this manner the blade receiver can be tipped up with its end facing the outer side of the disc cutter as is necessary for gripping by the guide. It is expedient in such a case to operate via a pushing member on the upper side of this end of the blade receiver via a substantially vertically directed piston and cylinder arrangement.

Basically, the guide can be construction in various manners. A particularly simple and reliable configuration is provided however if the guide is constructetd as a groove.

Support of the tipped-up blade receiver by the guide can be effected for example in the substantially horizontal entry. A particularly advantageous construction results however if the channel is pivotable about a horizontal axis from a substantially vertical ready position into a substantially horizontal working position. Means for entering and exiting the channel can be avoided in such an arrangement in an advantageous manner in that the horizontal axis is so arranged that the front part of the channel in its working position facing the axis of the disc cutter grips from below the end of the blade receiver facing the outer side of the disc cutter in its tipped-up position.

A particularly simple configuration largely suitable in particular for conversion of disc cutter machines, is provided in an advantageous further development if the channel is releasably insertable into the housing of the cutting machine.

In the event that the disc cutter machine is equipped with a pivotable brush device, arranged in the region of the blade receiver exchange opening, it is advantageous if the brush device is pivotable about a horizontal axis arranged across the disc cutter in the region of the end of the blade receiver facing the axis of the disc cutter. In this manner, the brush device need only be tipped up for carrying out the exchange process in order to free the blade exchange opening. Valuable space, in particular laterally of the machine, is not required for this.

In order to avoid the "threading-in process" necessary in conventional disc cutter machines for the new blade receivers, it is expedient to provide special centering means which automatically become effective upon sliding in of the new blade receiver along the guide. In a particularly expedient configuration of this type, each blade receiver is equipped in the region of its end facing the inner side of the disc cutter with a recess open towards the axis of the disc cutter for engagement in a centering member secured on the upper side of the disc cutter. During the insertion process via the guide, the recess thus comes automatically into engagement with the centering member so that without any particular "threading-in" operations, the end of the respective blade receiver facing the axis of the disc cutter is centered at once in the peripheral direction. According to this preferred exemplary embodiment, the blade receiver is further equipped on the lower side in the region of its end facing the outer side of the disc cutter with a conical opening which is contructed for engagement with a centering bolt arranged on the upper side of the disc cutter. If now the blade receiver descends with its end facing the outer side of the disc cutter, the conical opening comes into engagement with the centering bolt whereby this end is centered precisely both in the axial direction and also in the peripheral direction. Change in length of a blade receiver as a result of temperature effects or in any other manner thus has no influence on the centering since each blade receiver can displace in the radial direction on the centering member with its end facing the inner side of the disc cutter.

In the following for further explanation and better understanding of the invention, a preferred exemplary embodiment of a disc cutter machine operating in accordance with the method of the invention is described in more detail and explained.

FIGS. 1 to 5 shows the method of operation of the disc cutter machine according to the invention in five different phases in each case in a schematic vertical section through the machine in the region of the blade receiver exchange opening.

In the present case, a disc cutter machine is illustrated which is provided in the region of the blade receiver exchange opening 1 with a brush device 2 which can be pivoted about an axis 3 from the operating position illustrated in FIG. 1 into the rest position represented in the remaining figures. The axis 3 is secured via a bearing block 4 on the housing 5 of the machine, in which in known manner a disc cutter 6 is rotatably mounted. The disc cutter 6 possesses a plurality of passages 7 uniformly distributed across its periphery for the cut product. Over each of these passages is arranged a blade receiver 8 provided with blades.

The blade receiver 8 is equipped on its lower side in the region of its end 10 facing the axis 9 of the disc cutter with an incline 11 rising in the direction of the axis of the disc cutter. The disc cutter itself is provided in the region of this end 10 with a flat surface 12 on which—as appears from FIGS. 1 and 2—only a small strip 13 of the end 10 of the blade receiver 8 engages.

The end 10 of the blade receiver 8 facing the axis 9 of the disc cutter possesses furthermore a recess 14 open in the direction of the axis 9 of the disc cutter, in which a centering member 15 engages which is arranged on the upper side of the disc cutter and is secured to this. The recess 14 and the centering member 15 are so dimensioned that the blade receiver can be displaced within limits into its operating position illustrated in FIGS. 1 and 2 in the axial direction relative to the centering member 15, but however is centered in the peripheral direction in respect of the end precisely on the disc cutter 6.

Figure 2:
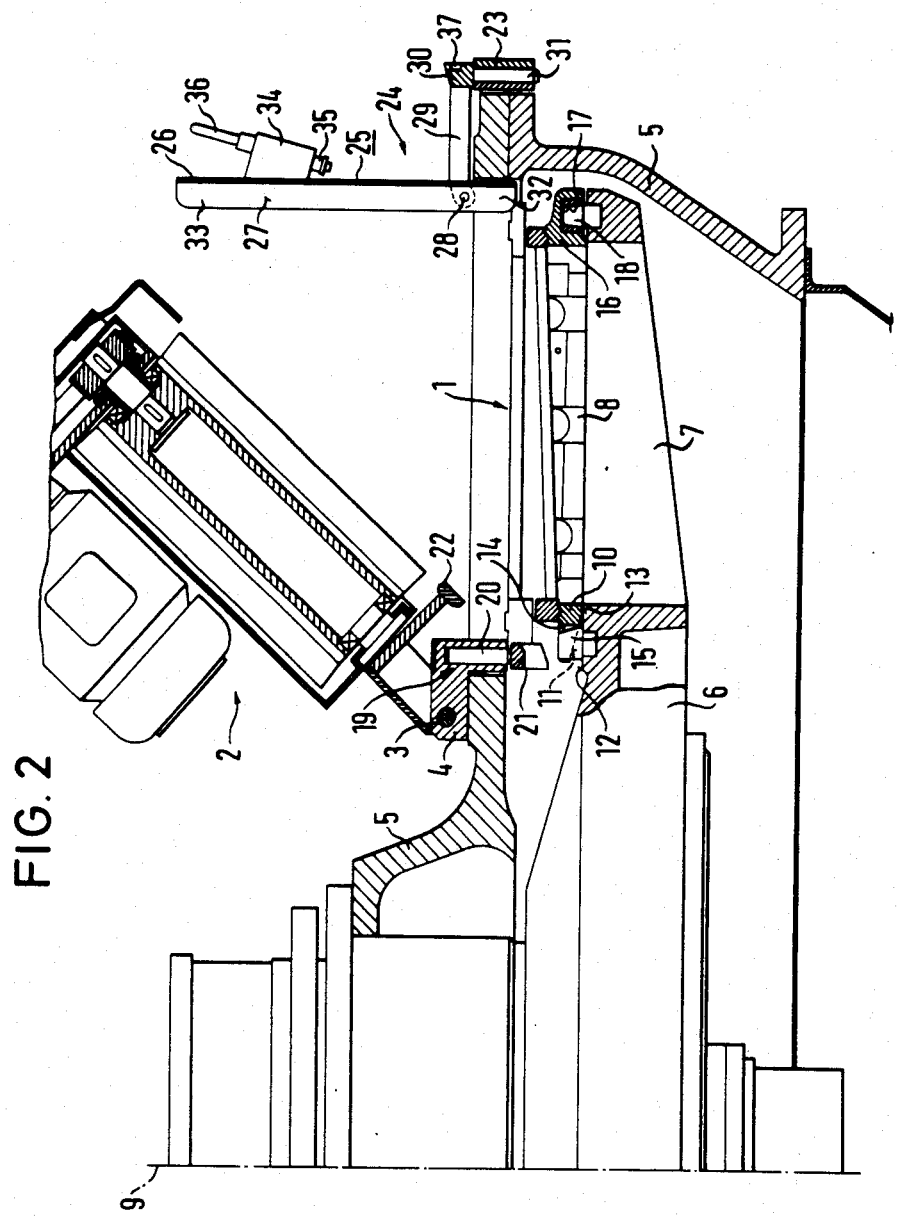
Figure 3:
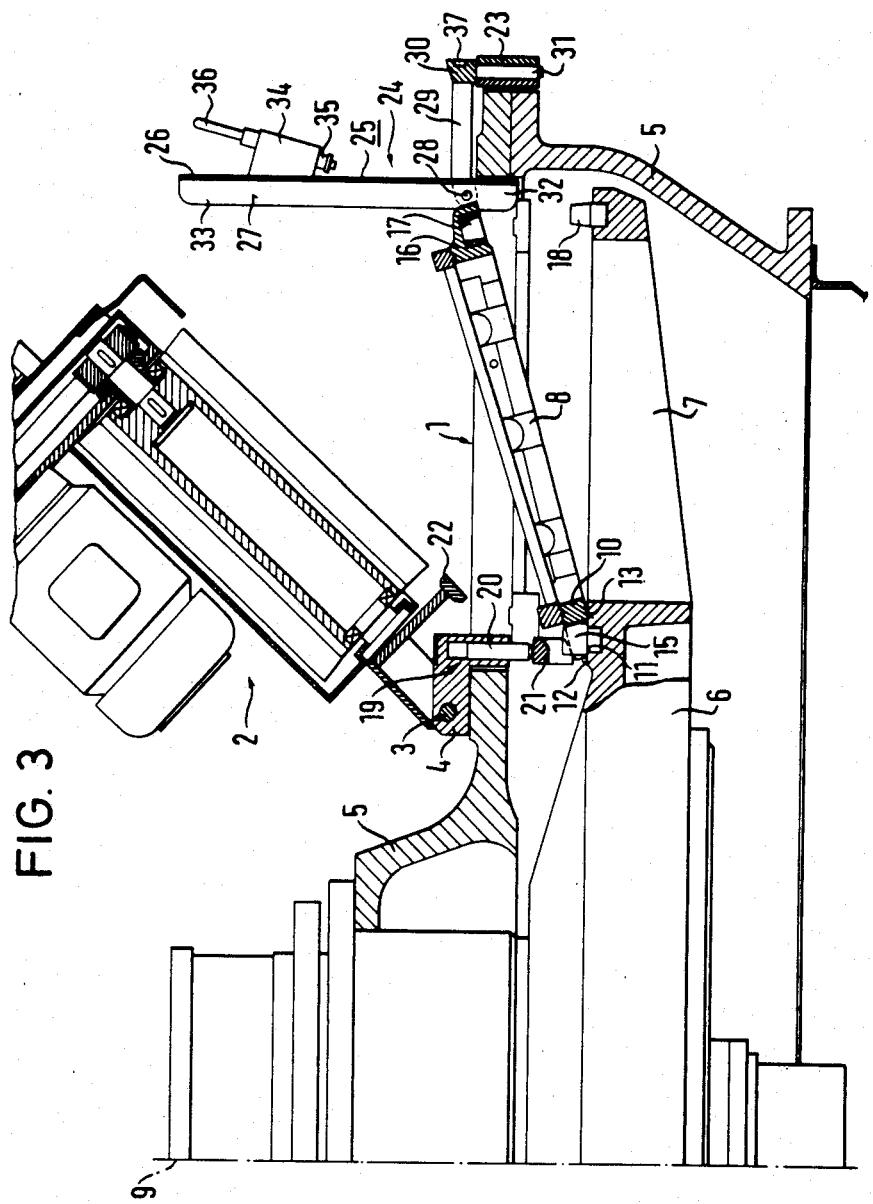
Figure 4:
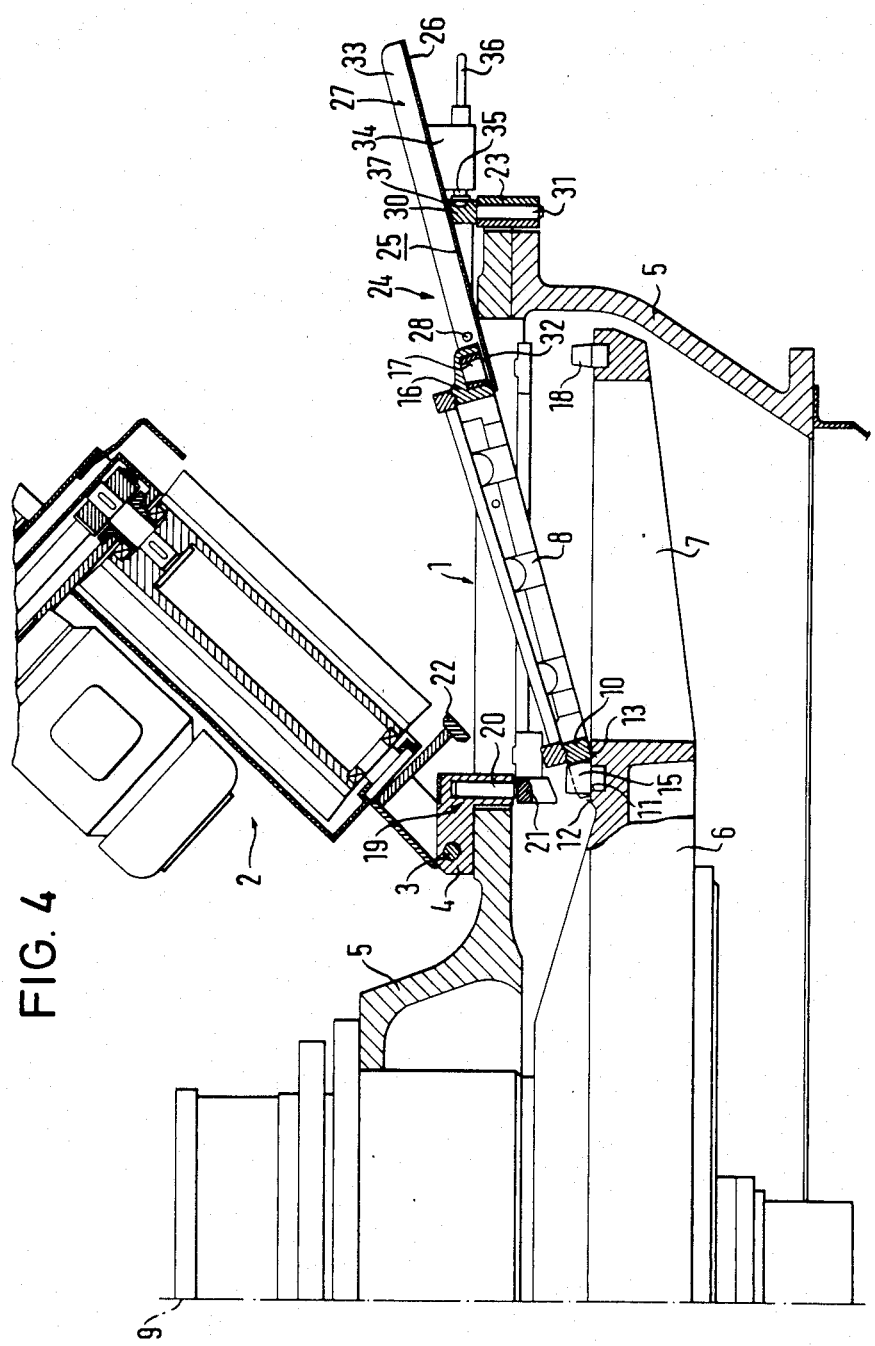

The end 16 of the blade receiver 8 facing the outer side of the disc cutter is provided with a conical opening 17 in which engages, in the position illustrated in FIGS. 1 and 2, a conical centering bolt 18 which is rigidly connected to the disc cutter 6. By means of the centering bolt 18, the end 16 of the blade receiver facing the outer side of the disc cutter is centered on the disc cutter 6 both in the axial direction and also in the peripheral direction precisely above the passage 7.

A tilting arrangement 19 is arranged in the housing 5 above the end 10 of the blade receiver facing the axis 9 of the disc cutter. This tilting arrangement comprises a substantially vertically directed piston-cylinder arrangement 20 which can exert pressure via a pushing member 21 on the upper side of the end 10 of the blade receiver 8.

On the brush device, there is furthermore secured a safety stop 22 which grips around the pushing member 21 of the piston and cylinder arrangement 20 in the operating position of the brush device according to FIG. 1.

On the housing 5 is secured outside the blade receiver exchange opening 1 a socket 23 in which a guide 24 can be releasably inserted. The guide 24 consists in the present exemplary embodiment of a channel 25 which has a flat floor 26 and narrow edges 27 on both sides. The channel—often referred to in technical language as a runway—has its width so dimensioned that a blade receiver can be displaced to and fro in the longitudinal direction of the channel on the floor 26 with lateral guidance by the edges 27.

The channel 25 is furthermore mounted for pivoting about a horizontal axis 28 which is secured via an arm 29 on a latching member 30. The latching member 30 comprises at least on peg 31 which can be displaced from above into the socket 23 secured on the housing 5.

The axis 28 is secured at a small spacing from one end of the channel 25 so that two channel parts are formed of which the foremost part 32 has a relatively short length and the other part 33 a relatively large length. The arm 29 carrying the axis 28 is so dimensioned that the channel 25 does not obstruct tilting of the blade receiver 8 to be described later in the vertical position illustrated in FIGS. 2 and 3.

On the lower side of the floor 26 of the channel 25, is displaceably mounted in a bearing block 34 a latching bolt 35 which can be activated by a hand grip 36. The bearing block 34 and the latching bolt 35 are so configured and arranged that the latching bolt comes into engagement with a latching opening 37 in the latching member 30 if the channel 25 is pivoted into the horizontal position illustrated in FIGS. 4 or 5.

If the disc cutter machine is in operation, the brush device 2 is located in the position illustrated in FIG. 1. In this position, the blades of the blade receivers are cleaned by means of an internal control device, known per se, by means of the rotating brush drum. In this position, the safety stop 22 also grips the pushing member 21 so that this cannot travel across the piston and cylinder arrangement from below.

If the blade receivers are to be exchanged, the brush device 2 is tipped up about the axis 3 from its working position into the rest position illustrated in FIG. 2. During this pivoting motion, the safety stop 22 connected to the brush device 2 comes out of engagement with the pushing member 21 of the piston and cylinder arrangement 20. By means of a positioning arrangement (not illustrated), furthermore the first blade receiver 8 is displaced by rotation of the disc cutter 6 beneath the blade receiver exchange opening 1 so that the exchange process can be initiated. For this purpose it is only necessary to activate the piston and cylinder arrangement 20. By this means, the pushing member 21 is guided downwards whereby it comes into engagement with the upper side of the end 10 of the blade receiver facing the axis 9 of the disc cutter. As a result of the incline 11, the end 10 of the blade receiver now tilts around the narrow strip 13 so that the blade receiver is tilted up into the position illustrated in FIG. 3. Before the tilting-up process—as appears from FIG. 2—the guide 24 has been placed in position in the region of the outer end of the blade receiver exchange opening 1 by displacing of the bolt 31 in the socket 23. Since the blade socket 8 is located in the tilted-up position illustrated in FIG. 3, it is only necessary to pivot the channel 25 by means of the handgrip 36 in the clockwise sense until the latching bolt 35 engages in the latching opening 37 of the latching member 30. Upon this pivoting motion of the channel 25, the part 32 grips the end 16 of the blade receiver 8 so that this can be displaced by simple pulling along the channel into the withdrawn position illustrated in FIG. 5.

In the illustrated exemplary embodiment, displacement of the blade receiver 8 along the channel 25 is carried out manually. If this operating procedure is to be automized, it is possible to provide in the region of the guide a withdrawing and displacing device which displaces the respective blade receiver mechanically along the channel.

If now the blade receiver withdrawn from the blade receiver exchange opening 1 lies on the channel 25, as illustrated in FIG. 5, is only necessary to feed this onto a prepared trolley or carrying table and to insert a new blade receiver. The new blade receiver is then displaced onto the channel in the reverse direction into the position illustrated in FIG. 4, centering of the end 10 in the peripheral direction taking place automatically in the end position. Upon insertion of the blade receiver 8 along the channel 28 the end 10 engages with the recess 14 precisely in the region of the centering member 15 without any difficult "threading-in" operations being necessary for this. If then the channel 25 is tilted up into the position illustrated in FIG. 3, the blade receiver 8 tilts with its end 16 into the position illustrated in FIG. 3. In this way, the centering bolt 18 with the conical opening 17 comes into engagement in the blade receiver 8 whereby the end 16 of the blade receiver 8 is fixed both in the radial direction and in the peripheral direction precisely over the passage 7 in the disc cutter 6.

Thus, the exchanging process for the first blade receiver is completed. The disc cutter is then rotated by a predetermined angle by the positioning arrangement into a position in which the next blade receiver lies beneath the blade receiver exchange opening. This blade receiver is then exchanged with a new blade receiver in the above-described manner and the cutting disc rotated to the next blade receiver. The exchange cycle is repeated until all blade receivers have been replaced by new blade receivers. Thereafter, the channel 25 is removed from the housing 5 by withdrawal of the bolt 31 from the socket 23 and the brush device is pivoted back into its working position as illustrated in FIG. 1.

I claim:
1. A method for exchanging a blade receiver in a disc cutter machine having a rotatable disc cutter with an axis and a periphery, the disc cutter including a blade receiver to be exchanged which is located in a radially extending position between the axis and the periphery of the disc cutter, the method comprising:
 (a) mechanically tilting up a peripherally located end of the blade receiver;
 (b) positioning a guide substantially radially with respect to the disc cutter for receiving the peripherally located end of the tilted blade receiver;

(c) withdrawing the blade receiver from the disc cutter by drawing the tilted blade receiver away from the disc cutter along the guide, substantially in a radial direction with respect to the disc cutter; and (d) inserting a new blade receiver into the disc cutter by guiding the new blade receiver along said guide into said radially extending position between the axis and the periphery of the disc cutter.

2. The method of claim 1 wherein the inserting step includes the steps of:

(i) peripherally centering an axially positioned end of the new blade receiver while a peripherally positioned end of the new blade receiver is tilted up with respect to the disc cutter; and (ii) lowering the peripherally positioned end of the new blade receiver to the disc cutter while radially centering the new blade receiver and peripherally centering the peripherally positioned end of the new blade receiver.

3. In combination:

(a) a disc cutter machine having a rotatable disc cutter with an axis and a periphery, the disc cutter including an exchangeable blade receiver in a radially extending position between the axis and the periphery of the disc cutter, and (b) means for exchanging the blade receiver, including means for tilting up a peripherally located end of the blade receiver, a blade receiver guide and means for supporting the blade receiver guide in a substantially radial position with respect to the disc cutter for receiving the peripherally located end of the blade receiver when tilted up, and for supporting and guiding a tilted blade receiver during substantially radial withdrawal of the blade receiver from, or insertion of a blade receiver into, the disc cutter.

4. Disc cutter machine according to claim 3 further including a withdrawing and displacing device for coupling to a blade receiver supported in the guide.

5. Disc cutter machine according to claim 4 further including a magazine connectable to a respective withdrawing and displacing device for automatically receiving a blade receiver to be exchanged and automatically releasing a new blade receiver.

6. Disc cutter machine according to claim 3 wherein the tilting means is positioned above the disc cutter in a region of an axially positioned end of the blade receiver facing an inner side of the disc cutter the tilting means operating on said axially positioned end to tilt up the peripherally located end of the blade receiver.

7. Disc cutter machine according to claim 6 wherein the disc cutter is provided for contact with the axially positioned end of the blade receiver with a flat surface and the blade receiver is provided in a region of said axially positioned end on a lower side thereof with an incline which rises towards the axis of the disc cutter.

8. Disc cutter machine according to claim 7 comprising tilting means having a substantially vertically oriented piston and cylinder operating via a pushing member on an upper side of the axially positioned end of the blade receiver.

9. Disc cutter machine according to claim 3 wherein the guide is constructed as a channel.

10. Disc cutter machine according to claim 9 wherein the channel is pivotable about a horizontal axis from a substantially vertical ready position into a substantially horizontal working position.

11. Disc cutter machine according to claim 10 wherein the horizontal axis is positioned so that a forward part of the channel when in its working position supports the peripherally located end of the blade receiver, which faces an outer side of the disc cutter, when the blade receiver is in a tilted-up position.

12. Disc cutter machine according to claim 11 wherein the channel is releasably insertable into a housing portion of the disc cutter machine.

13. Disc cutter machine according to claim 3 comprising a pivotable brush device positioned in a region above the blade receiver, the brush device being pivotable about a horizontal axis arranged above the disc cutter in a region of an axially positioned end of the blade receiver which faces the axis of the disc cutter.

14. Disc cutter machine according to claim 3 further including a centering member secured on an upper side of the disc cutter for centering an axially positioned end of the blade receiver, and a recess in an axially positioned end of the blade receiver, which recess is open towards the axis of the disc cutter for engagement in the centering member secured on the upper side of the disc cutter.

15. Disc cutter machine according to claim 3 further including a centering bolt positioned on an upper side of the disc cutter for centering the peripherally located end of the blade receiver, the blade receiver further including a conical opening in a lower side thereof for engaging with said centering bolt.

* * * * *